United States Patent [19]
Crook et al.

[11] Patent Number: 5,291,529
[45] Date of Patent: Mar. 1, 1994

[54] HANDSHAKE SYNCHRONIZATION SYSTEM

[75] Inventors: Neal A. Crook, Reading; Paul L. Bruce, Basingstoke; Robert J. Galuszka, Reading, all of England

[73] Assignee: Digital Equipment International Limited, Fribourg, Switzerland

[21] Appl. No.: 988,559

[22] Filed: Dec. 10, 1992

[30] Foreign Application Priority Data

Dec. 13, 1991 [GB] United Kingdom ............. 9126513

[51] Int. Cl.⁵ ............... H04L 7/00; H03K 5/13; H03K 7/00; H03L 7/00
[52] U.S. Cl. .................... 375/109; 307/269; 328/63
[58] Field of Search ............ 395/106, 107, 109; 340/825.1, 825.07, 825.14; 307/269; 328/63

[56] References Cited

U.S. PATENT DOCUMENTS

| | | |
|---|---|---|
| 4,017,740 | 4/1977 | Farnbach et al. |
| 4,070,630 | 1/1978 | Hepworth et al. |
| 4,289,976 | 9/1981 | Maly. |
| 4,727,370 | 2/1988 | Shih ........................ 375/109 |
| 4,873,703 | 10/1989 | Crandall et al. |
| 4,973,860 | 11/1990 | Ludwig ...................... 328/63 |
| 5,012,138 | 4/1991 | Suzuki. |
| 5,036,221 | 7/1991 | Brucculeri et al. |
| 5,045,801 | 9/1991 | Mowery. |

Primary Examiner—Curtis Kuntz
Assistant Examiner—Duane Kobayashi
Attorney, Agent, or Firm—Kenneth F. Kozik; A. Sidney Johnston; Albert P. Cefalo

[57] ABSTRACT

A method and apparatus for improving the performance of the transferring of transaction handshakes between sections of synchronous logic which are in different timing domains providing immunity from set-up and hold violations and associated problems of metastability, by reducing the time overhead required for signal synchronization.

10 Claims, 8 Drawing Sheets

HANDSHAKE SYNCHRONIZATION SYSTEM

FIELD OF THE INVENTION

The present invention relates to the transfer of handshakes between functional blocks of synchronous logic which are in different timing domains, and particularly to a method and apparatus for overcoming problems associated with set-up and hold violations while reducing the overall time for a transaction between two such functional blocks.

BACKGROUND OF THE INVENTION

In the design of digital circuitry, it is common that two functional blocks operating in two different timing domains wish to communicate with one another. This is typically performed in a master/slave transaction involving three steps:
i) the master unit initiates a request to the slave unit,
ii) the slave unit detects the request, and services it, and
iii) the slave unit indicates completion of the task by returning an acknowledgement to the master unit.

In situations where the master and slave units have no common timing reference, i.e. the system clocks of the respective functional blocks are operating at different speeds, it is essential to ensure that the signals passed between master and slave units are not misinterpreted. Such misinterpretations can occur where signals are asserted by the master unit during the set-up and hold period of input logic of the slave unit. For example, the input signal to slave unit logic should not change for a small period of time both before, and after, the valid clock edge of the slave timing domain. If such a situation does occur, then the output of the input logic to the slave unit will be uncertain, and metastability of the slave unit input logic can occur.

A known technique in avoiding this problem is to use dual rank synchronization. In this technique, a catching cell is used at the input to the slave unit, S, and an example of this is shown in FIG. 1.

Figure 1:
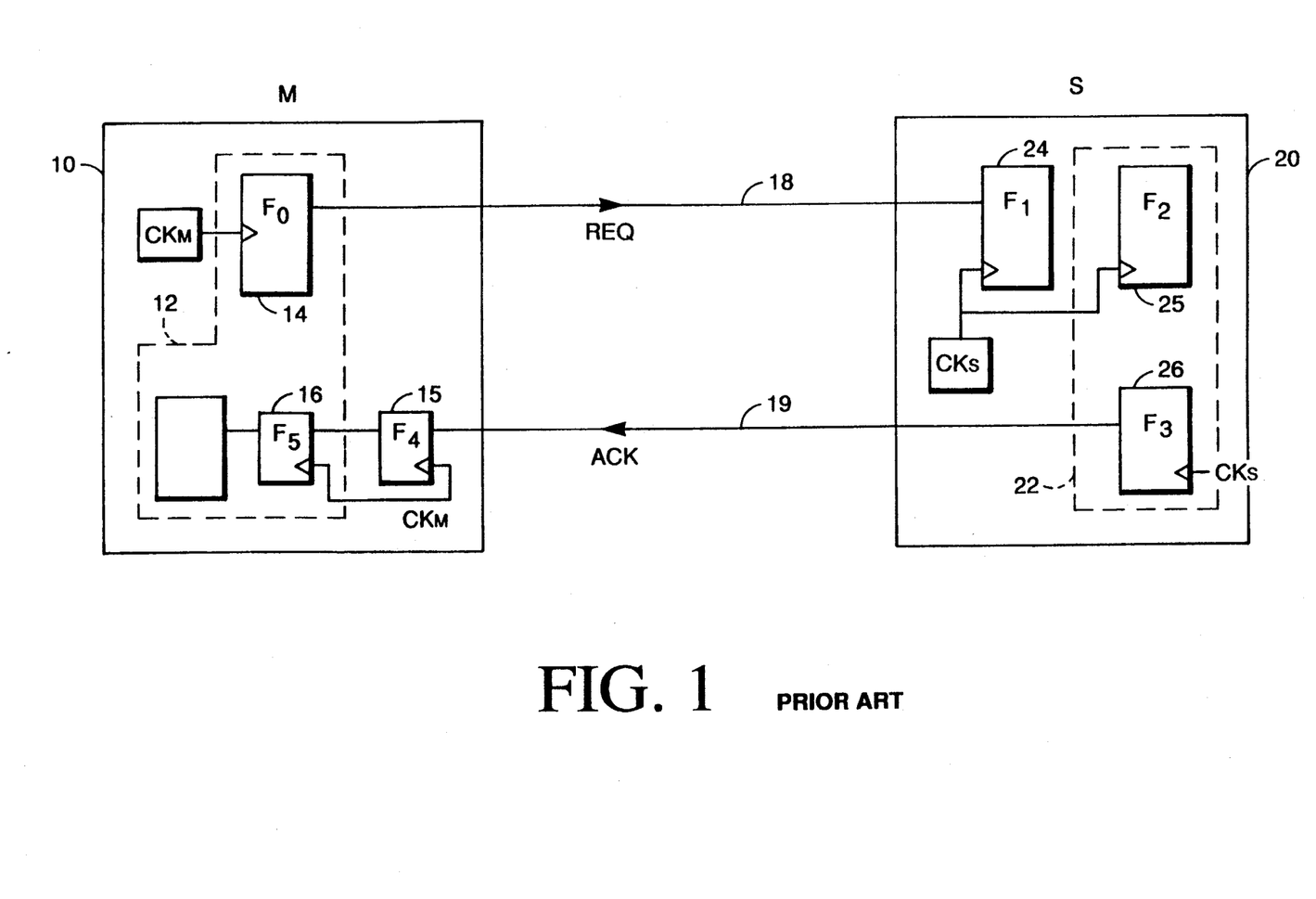
FIG. 1 shows apparatus for transferring handshake signals between two blocks of functional logic operating at different clock speeds according to the prior art.

In FIG. 1 there is shown a master unit 10 coupled to a slave unit 20 by means of communication lines 18, 19. Master unit 10 has an internal clock $CK_M$, and slave unit has an internal clock $CK_S$. The time taken for a transaction signal request (REQ) generated by master unit 10 to reach the input of a transaction machine 22 in slave unit 20 over request line 18 is thus variable, lying between the extremes of two cases. If the signal generated by an output flip-flop 14 in master unit 10 reaches flip-flop 24 immediately prior to the set-up time of flip-flop 24, then the signal will be propagated through to flip-flop 25 at the first slave clock edge thereafter, and will be propagated through to the output of flip-flop 25 at the second slave clock edge thereafter. The transfer time is thus approximately one clock period in the slave timing domain.

Alternatively, the signal generated by flip-flop 14 reaches flip-flop 24 during or after the set-up and hold time, and the signal is not propagated through to the input of flip-flop 25 until the second slave clock edge. (Any metastability which may have resulted from the asynchronous input to flip-flop 24 will by then have been resolved.) The signal will then be propagated through to the output of flip-flop 25 after the third slave clock edge. The transfer time is thus approximately two clock periods of the slave timing domain.

The signal received by transaction machine 22 may be acknowledged by returning an acknowledge signal (ACK) on line 19, via output flip-flop 26, and is received by a master unit transaction machine 12 in similar manner using flip-flops 15, 16.

For a total transaction, including the return of the acknowledge signal back into the master timing domain, the total time is a maximum of 2×(slave clock period + master clock period) + transaction processing time in the slave functional block. Everything other than the transaction processing time in the slave unit is an overhead. There is a requirement to reduce this overhead in the total transaction time to a minimum.

SUMMARY OF THE INVENTION

The present invention is directed toward a system for reducing the time taken for such transactions, while maintaining immunity from the problems of metastability caused by violations of the set-up and hold periods of such functional logic. It is an object of the present invention to provide apparatus capable of reducing this transaction time, both for situations where the transaction requestor is in a faster timing domain, and where the transaction requestee is in a faster timing domain.

It is a feature of the present invention that the system herein described operates where the transaction processing time is non-deterministic, and is relatively short with respect to the timing domain, i.e. the transaction processing time is over a few tens of clock periods. In such situations, reduction of the transaction time overhead related to transitions between the domains is most significant.

It is a feature of one embodiment of the present invention that the phase relationship of the two clocks is determined once at the beginning of a transaction, and then that phase relationship is used for the acknowledgement of that transaction.

It is an object of the present invention to provide apparatus for synchronizing the passage of data between a first logic circuit operating at a first clock speed and a second logic circuit operating at a second clock speed, said first clock speed being slower than said second clock speed, and including means in the second logic circuit for suppressing the transfer of data from the second logic circuit to the first logic circuit during clock periods in which the first logic circuit is in a state in which data may be incorrectly received by the first logic circuit.

It is a further object of the present invention to provide a method for communication between a first system operating in a first timing domain at a first clock speed, and a second system operating in a second timing domain at a second clock speed, said second clock speed being faster than said first clock speed and said different speeds having a predetermined relation to one another, said systems being coupled by a communication link, wherein said method comprises the following steps:
a) said first system issuing a transaction request over said communication link to said second system as a result of a clock edge in said first timing domain;
b) said second system accepting said transaction request as a result of a clock edge in said second timing domain, said acceptance of said transaction request being communicated to a phase synchronization state machine within said second system and to a transaction state machine within said second system;
c) said transaction machine processing said transaction request and said phase synchronization machine counting the number of clock cycles in said second timing domain during the processing of said transaction;

d) upon completion of said transaction, said second system generating an acknowledge signal to be transmitted from said second system to said first system over said communication link as a result of a clock edge in said first timing domain, said synchronization being achieved by said phase synchronization machine using said predetermined relation between said different clock speeds in order to determine allowable clock periods of the second timing domain to transmit said acknowledge signal to said first timing domain.

DESCRIPTION OF PREFERRED EMBODIMENT

The apparatus of FIG. 1 has already been described with reference to the prior art.

Figure 2:
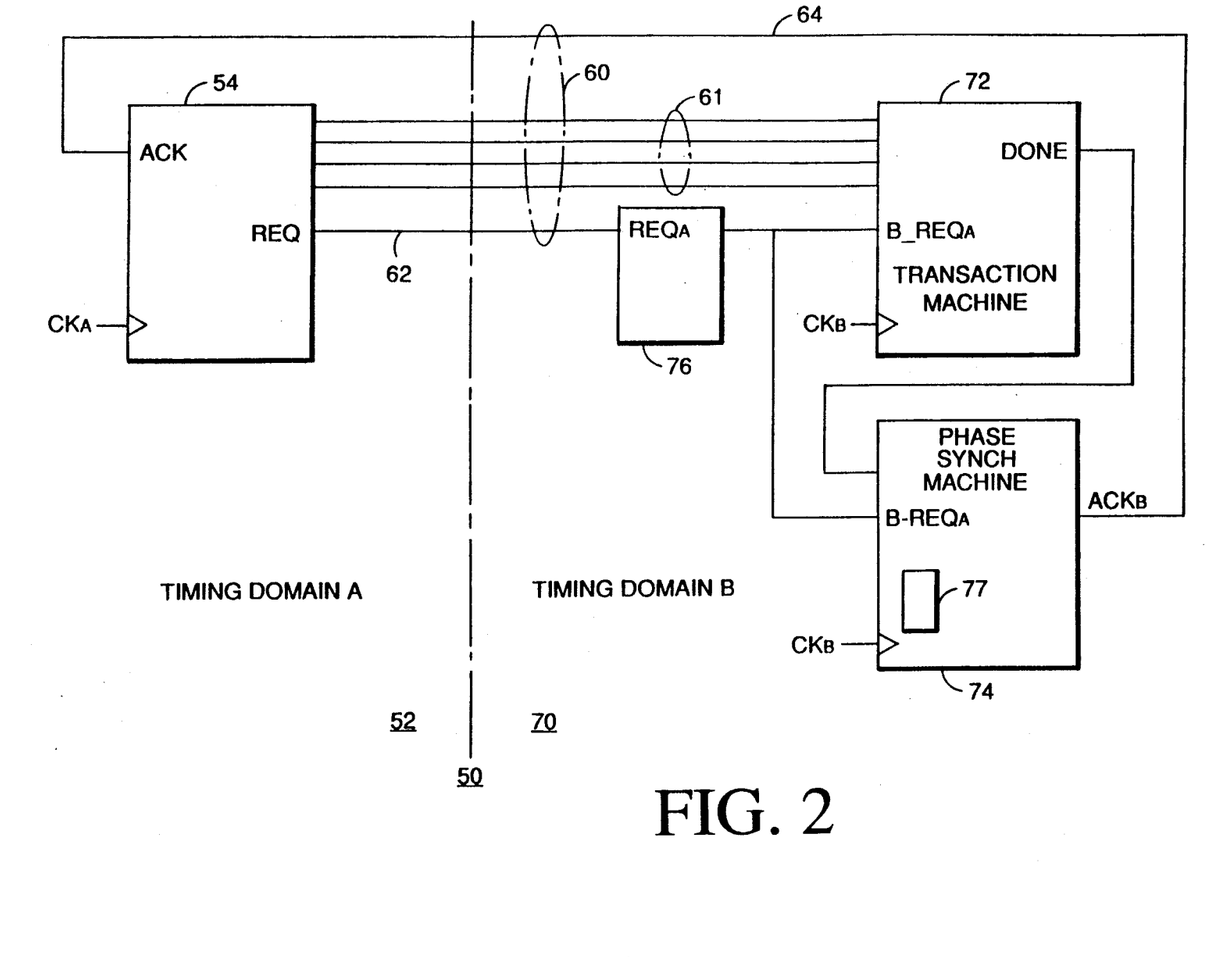
FIG. 2 shows a block diagram of apparatus according to a first embodiment of the present invention.

Referring to FIG. 2, there is shown a first embodiment of the present invention, in which there is provided a system 50, comprising a first logic circuit 52 which operates at a first clock speed $CK_A$ in a first timing domain, A, and a second logic circuit 70 which operates at a second clock speed $CK_B$ in a second timing domain, B. The first logic circuit includes a transaction machine 54 which is capable of generating transaction requests to be transmitted to the second logic circuit 70 over a communication link 60. The communication link may include address lines, read/write lines, and data lines (61), together with a request line 62 and an acknowledge line 64. The first clock speed is slower than the second clock speed, and there is a predetermined frequency ratio between $CK_A$ and $CK_B$. In a preferred embodiment, the first clock speed is at least three times slower than the second clock speed.

The second logic circuit 70 comprises a transaction machine 72 which is coupled to receive transaction information from the first logic circuit 54 over the communication link 60 including a transaction request on line 62 via synchronizing edge-triggered flip-flop 76. Transaction machine 72 is also coupled to return an acknowledge signal to the first logic circuit 52 over the acknowledge line 64 via a phase synchronization machine 74, which is shown to include a means for using input signals 77, following processing of the transaction. It is a particular feature of this embodiment that the duration of this transaction is of unknown length, but is typically less than a few tens of clock cycles.

The phase synchronization machine 74 is also coupled to receive the request signal $REQ_A$ from the first logic circuit via flip-flop 76, and to use that request signal to infer, with a constrained degree of ambiguity, the phase relationship between timing domain A and timing domain B at the time that phase synchronization circuit receives the signal.

Figure 3:
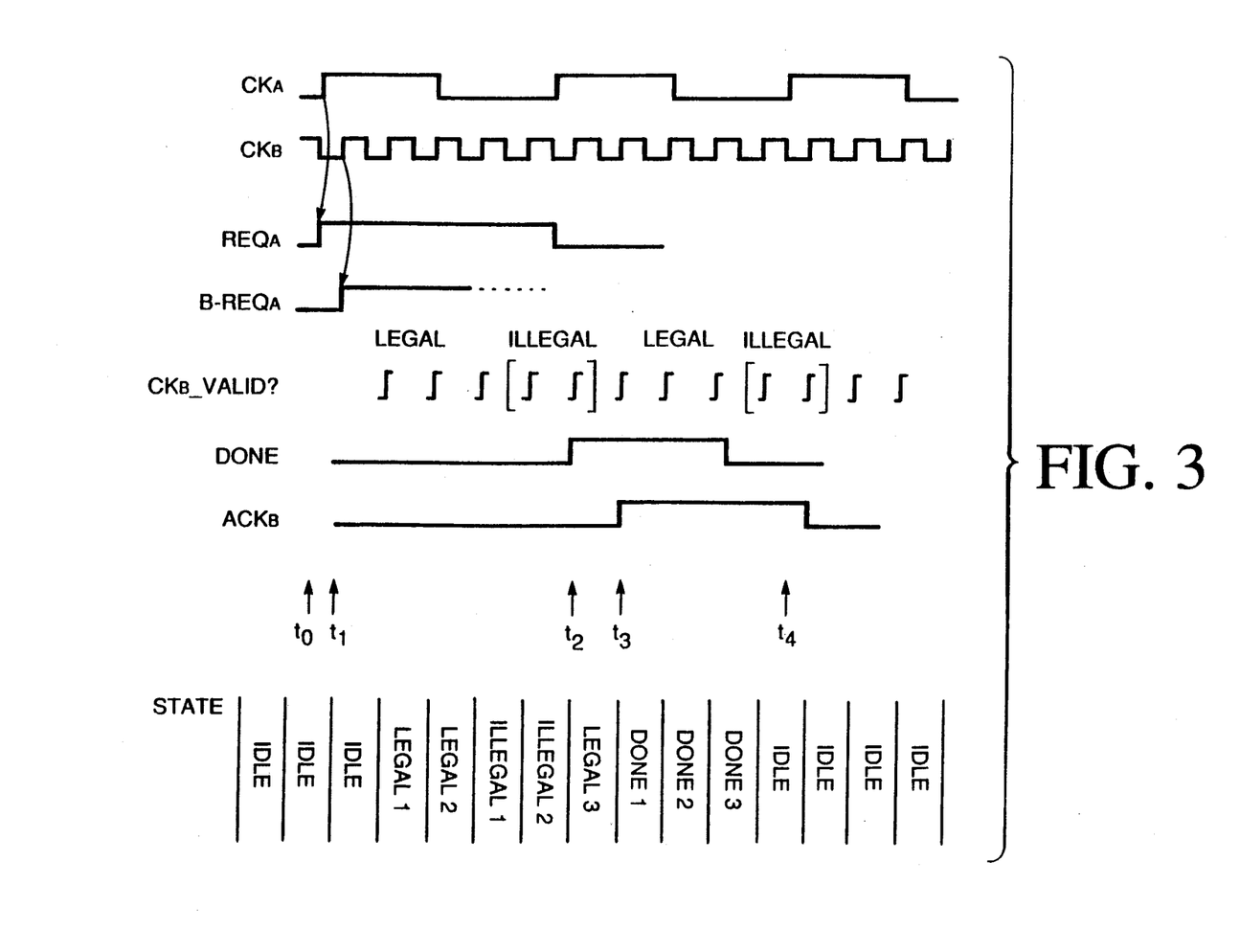
FIG. 3 shows a timing diagram showing an example of the relevant signal timings of the apparatus of FIG. 2.

Referring also to FIG. 3, the system operates as follows. At a time $t_0$, the transaction machine 54 generates a transaction on communication link 60, including assertion of a transaction request pulse $REQ_A$ on line 62. Synchronizing flip-flop 76 will pass this request $B\_REQ_A$ to both transaction machine 72 and phase synchronization machine 74 at the next rising edge of clock B ($CK_B$) at time $t_1$.

Phase synchronization machine 74 then commences counting the clock cycles in timing domain B while transaction machine 72 implements the transaction. The phase synchronization machine is operative to count the number of clock cycles in timing domain B that elapse whilst the transaction is being processed, and to determine whether each of the clock edges associated with the clock cycles ($CK_B\_VALID$?) may be regarded as legal, or illegal in timing domain A. A legal clock edge is one where a signal transitioning on this edge will meet the set up and hold requirements of a flip-flop clocked in timing domain A. The phase synchronization machine causes a returning DONE signal from transaction machine 72, generated at time $t_2$, to be propagated through to the $ACK_B$ output at time $t_3$, and of sufficient duration that it will be sampled by clock A at time $t_4$. $ACK_B$ will therefore not be propagated through to timing domain A over line 64 except to be synchronous to a legal clock edge of transaction machine 54. The state transitions of phase synchronization machine 74 are indicated on the timing diagram as "STATE".

Figure 4:
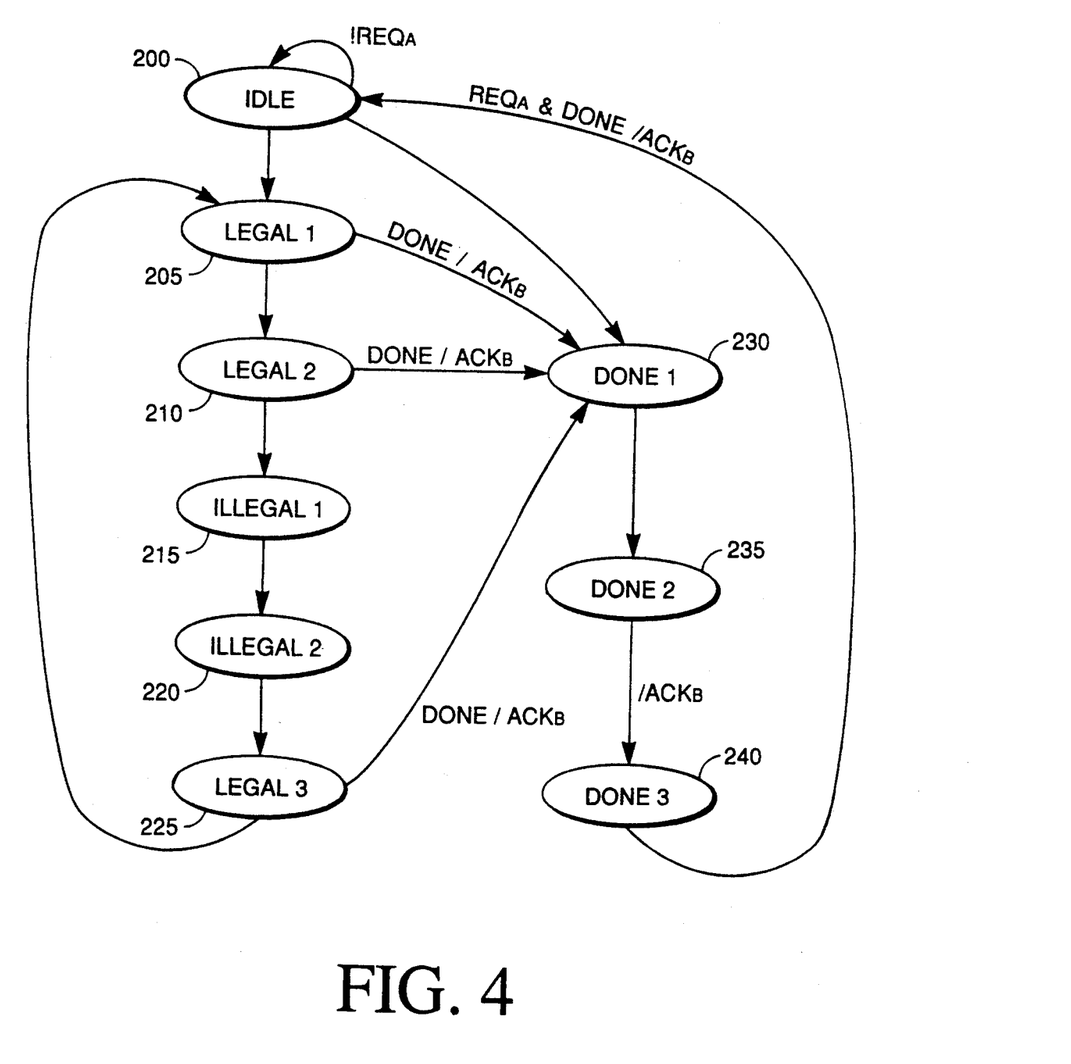
FIG. 4 shows a state diagram indicating the state transitions of the phase synchronization machine of FIG. 2.

Referring to FIG. 4, there is shown a state diagram indicating the state transitions passed through by the phase synchronization machine 74. While there is no $REQ_A$ asserted ($!REQ_A$), the phase synchronization machine remains in an idle state 200. Upon receipt of a request signal $REQ_A$ (and not a done signal (&!DONE)) the phase synchronization machine 74 transitions out of the idle state 200 and into the first of a number of states 205, 210, 225 indicating clock transitions legal in timing domain A. From any of these legal states, a DONE status in transaction machine 72 allows transition into the DONE state 230 of the phase synchronization machine, causing acknowledge signal $ACK_B$ to be transmitted to transaction machine 54. Upon entering an illegal state 215, 220, the DONE state may not be entered, and the DONE signal from transaction machine 72 will not initiate the $ACK_B$ signal until the next legal state is entered. Where the frequency ratio of clocks A and B is not an exact multiple, the loop 205–225 will be more complex, and may involve a longer series of legal and illegal states within the loop.

Multiple DONE states 230, 235, 240 may be necessary to ensure that the $ACK_B$ signal is asserted for a long enough duration to be seen by one, and only one clock transition in timing domain A.

In the example shown in FIG. 3, where the frequency ratio is exactly five, the algorithm required to determine which clock edges in timing domain B may be used is simple. Where the frequency ratio of the two timing domains is not a whole number, a more complex algorithm will be required.

It will be necessary for the transaction to be completed and acknowledged within a maximum time period determined by the uncertainty in the clock frequencies, and it is possible to include within the phase synchronization machine a counter to impose such a limitation on this period.

Figure 5:
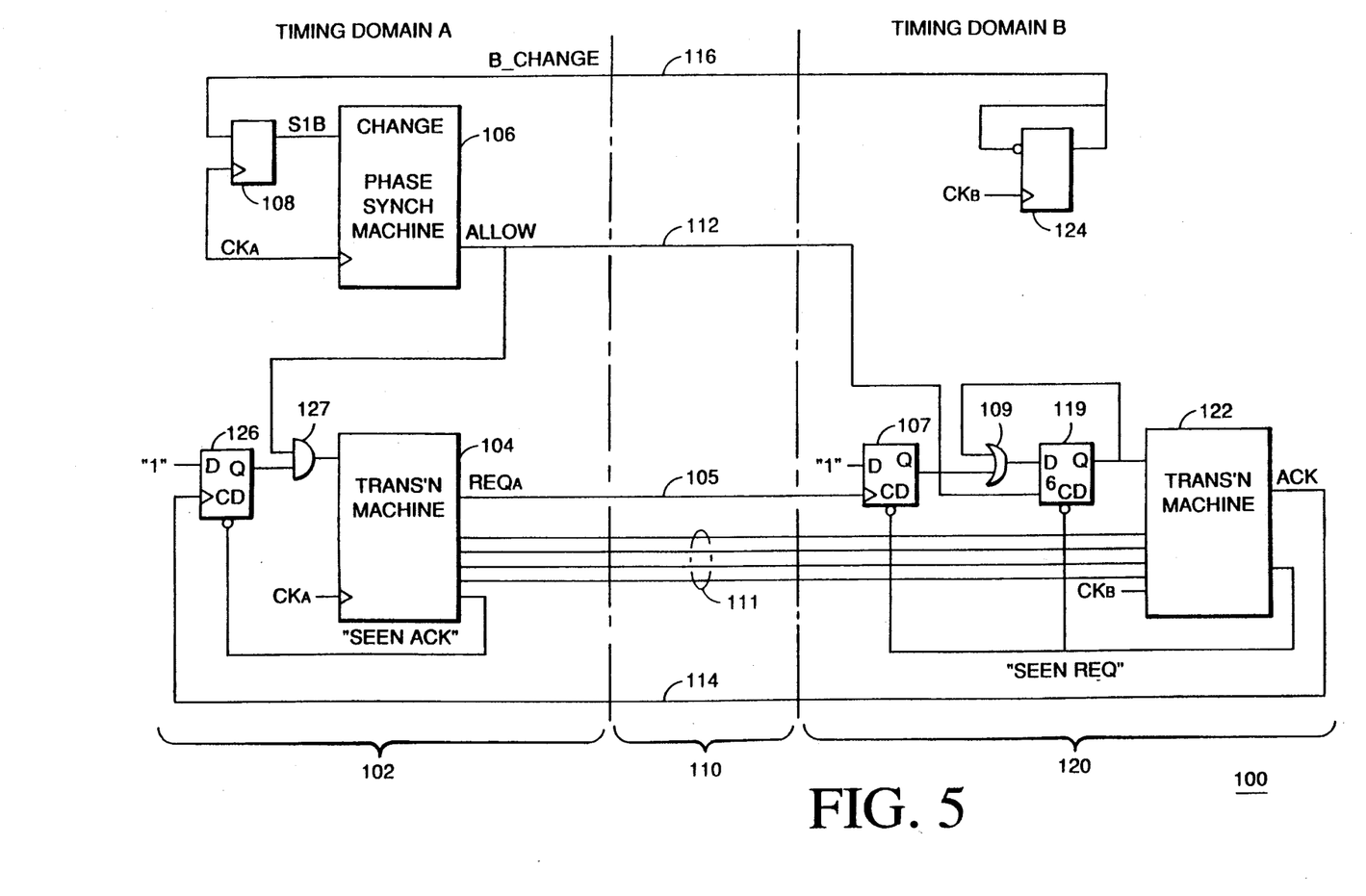
FIG. 5 shows a block diagram of apparatus according to a second embodiment of the present invention.

Referring to FIG. 5, there is shown a further embodiment of the present invention, in which there is provided a system 100, comprising a first logic circuit 102 which operates at a first clock speed $CK_A$ in a first timing domain, A, and a second logic circuit 120 which operates at a second clock speed $CK_B$ in a second timing domain, B. The first logic circuit includes a transaction machine 104 which is capable of generating transaction requests to be transmitted to a second logic circuit 120 over a communication link 110. The communication link may include address lines, read/write lines, and data lines (111), together with a request line 105, an "ALLOW" request line 112 and an acknowledge line 114. Additionally, there is a synchronization line 116. In this embodiment, the first clock speed $CK_A$ is faster than the second clock speed $CK_B$. In a preferred embodiment, the first clock speed is at least three times faster than the second clock speed.

The second logic circuit 120 includes a transaction machine 122 which is coupled to receive transaction information from the first logic circuit 102 over the communication link 110, including a transaction request $REQ_A$ on line 105 via an edge detecting flip-flop 107, OR gate 109 and latch 119. Transaction machine 122 is also coupled to return an acknowledge signal ACK to the first logic circuit 102 over the acknowledge line 114, via edge detecting flip-flop 126 and via AND gate 127, following processing of the transaction.

Gating logic 109, 119, 127 is controlled by the ALLOW signal provided on line 112 by the phase synchronization machine 106.

The second logic circuit 120 also includes a flip-flop 124 generating a clock change signal (B_CHANGE) which indicates each transition of $CK_B$: in effect, a signal with exactly one-half the frequency of $CK_B$. The B_CHANGE signal is transmitted to the first logic circuit 102 over synchronization line 116. A flip-flop 108 is operative to pass this B_CHANGE signal into timing domain A, where it is received by phase synchronization machine 106. The flip-flop 108 provides the first rank of dual rank synchronization. The second rank of the dual rank synchronization is provided by the state flip-flops which form part of the implementation of the phase synchronization machine 106. Phase synchronization machine 106 is then operative to determine which clock edges in timing domain A will be valid in timing domain B, and to provide an indication of this to transaction machines 104, 122 on ALLOW line 112.

Figure 6:
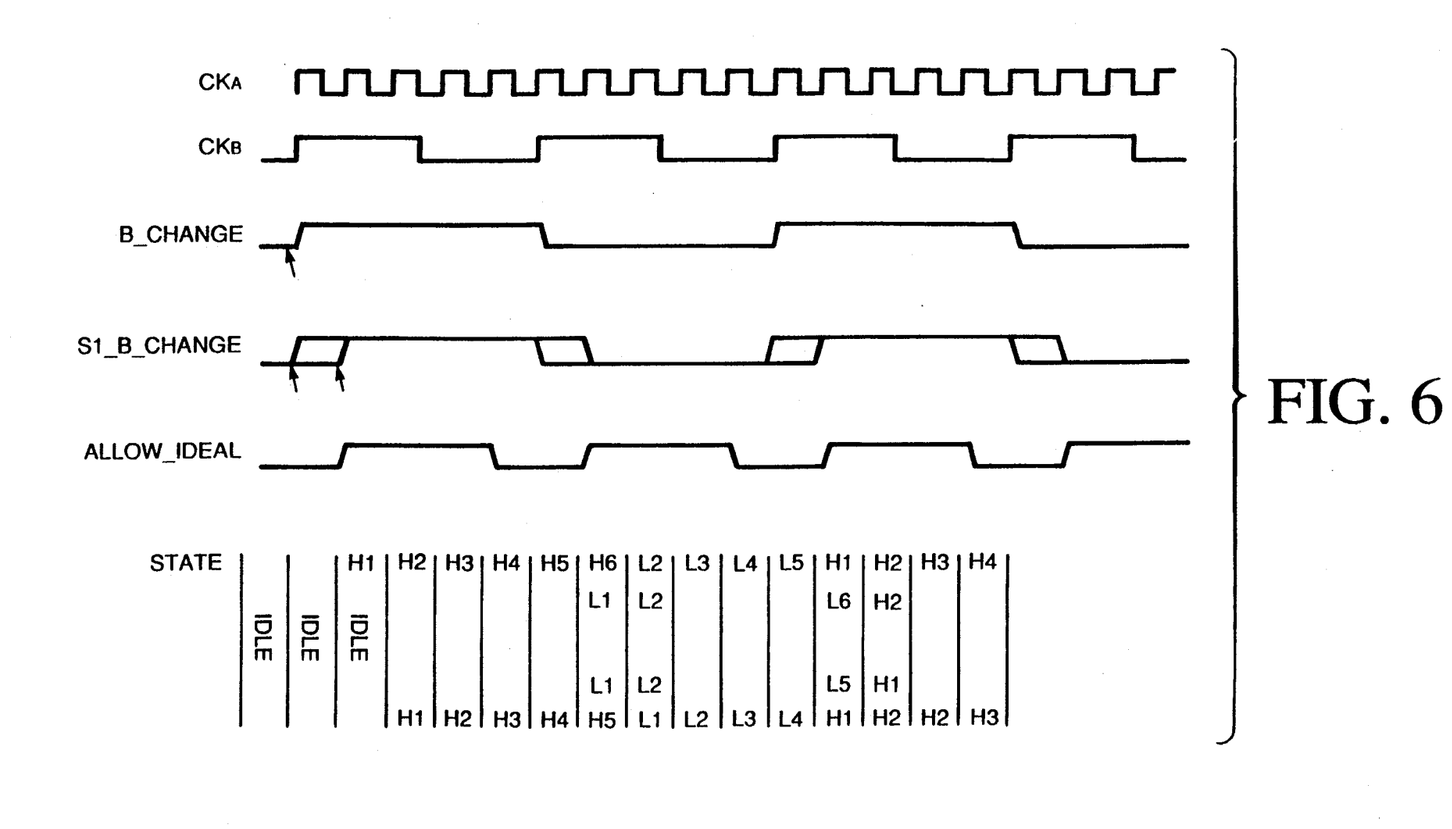
FIG. 6 shows a timing diagram showing an example of the relevant signal timings of the apparatus of FIG. 5.

With reference now to FIG. 6, the timing operation is as follows. At a time $t_0$, the B_CHANGE signal is asserted on line 116 by flip-flop 124, and is synchronized to timing domain A by edge-triggered flip-flop 108, which passes the signal to the S1_B_CHANGE input of phase synchronization machine 106, synchronized with the next $CK_A$ rising clock edge. As indicated in the diagram, there is uncertainty which clock edge will cause this transition, shown as the two successive edges to the S1_B_CHANGE signal. The transition may occur at time $t_1$ or at $t_1'$. The same situation occurs with each transition in B_CHANGE. By analysis of the situation for any fixed frequency relationship between clock A and clock B it is possible to determine the states required in phase synchronization machine 106 to track the transitions of S1_B_CHANGE. The aim is to synthesize the ALLOW signal, which is shown in the diagram in its idealized form, such that the signal is never asserted during a B_CHANGE transition for that particular frequency relationship. The phase synchronization machine is thus designed to accommodate the particular frequency ratio of the two circuits, and synthesizes the required ALLOW signal to accommodate the uncertainty of the time of transition of S1_B_CHANGE at either $t_1$ or $t_1'$. The precise sequence of states which will be followed will depend upon the actual transition of S1_B_CHANGE which takes place. The ideal ALLOW signal cannot be realized due to the ambiguity in the edges of S1_B_CHANGE.

A request is generated by transaction machine 104 on communication link 110, including a transaction request pulse $REQ_A$ on line 105. This request is held on the output of edge detector 107. If signal ALLOW is asserted, then the output of edge detector 107 asserts: this indicates that $CK_B$ has not just changed, and is not about to change. In this situation, the request on the output of edge detector 107 is passed through OR gate 109 and latch 119. Once ALLOW negates, the request will be held on the output of latch 119, and will be sampled by the transaction machine 122 with no possibility of metastability.

If signal ALLOW is negated when the output of edge detector 107 asserts, the gate input G of latch 119 will be closed, keeping its output stable during the time at which $CK_B$ rises. The request on the output of edge detector 107 will be delayed until the next assertion of ALLOW.

In either case, the edge detector 107 and latch 119 are reset by the transaction machine 122 upon receipt of the request using line "SEEN REQ".

At the end of the transaction, acknowledge signal $ACK_B$ is passed from transaction machine 122 back to transaction machine 104 on line 114 via edge-detecting flip-flop 126. The ACK signal is held on the output of the edge detector 126. ALLOW will always be negated when the ACK signal is generated ensuring that a signal generated from a rising edge of $CK_B$ cannot immediately propagate into logic clocked by $CK_A$.

When ALLOW next asserts, AND gate 127 allows the output of edge detector 126 to propagate into transaction machine 104. Edge detector 126 is reset by transaction machine 104 upon receipt of the ACK signal using line "SEEN ACK".

Figure 7:
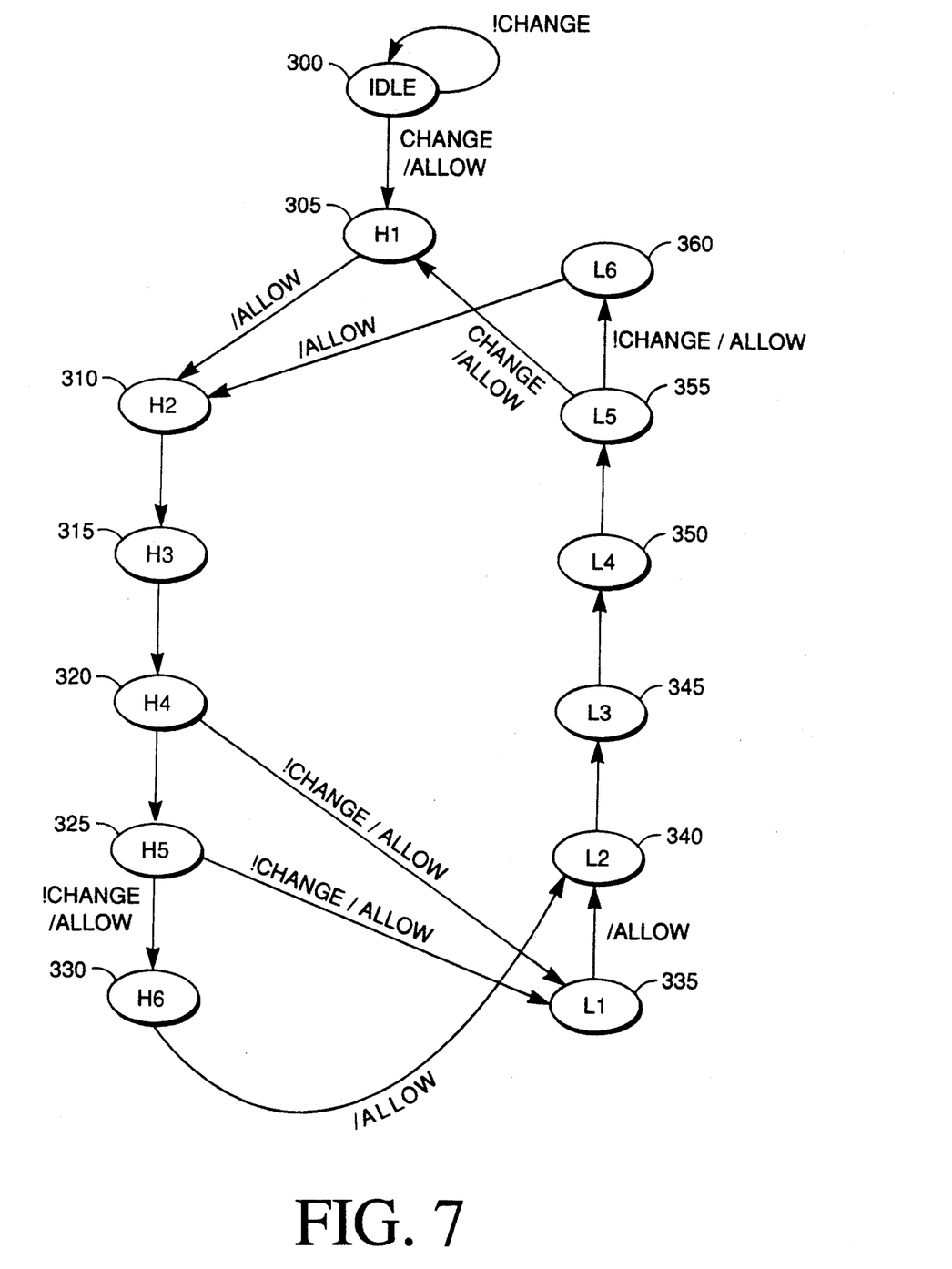
FIG. 7 shows a state diagram inidcating the state transitions of the phase synchronization machine of FIG. 5.

In FIG. 7 there is shown a state diagram indicating the state transitions passed through by the phase synchronization machine 106 in the embodiment for which FIG. 6 represents the timing diagram (frequency ratio $CK_A:CK_B$ is 5:1). Upon start up, the phase synchronization machine loops in an idle state 300 until S1_B_CHANGE signal changes state (CHANGE). The phase synchronization machine transitions into successive high states (H1 ... Hn) until S1_B_CHANGE transitions again (!CHANGE). For the first two transitions to H1 and H2 (305,310), the ALLOW signal is asserted (/ALLOW) When transitioning out of the H2 state, the ALLOW signal must be deasserted, since in the event that state H1 was entered at time $t_1'$, and allowing for set-up and hold requirements, it is not safe to assert a request until after the next CHANGE signal. This CHANGE signal will cause the phase synchronization machine to transition out of the H4, H5 or H6 states (320-330) to states L1, L1 or L2 respectively (335,340).

The ALLOW signal may once again be asserted after this transition, for a maximum of two clock cycles ($CK_A$), except that if state H6 has been entered, it is only safe to assert ALLOW for a single clock cycle thereafter. The return path of the state diagram L3 to L6 (345-360) is similar, although note that the transition L4 to H1 is not required.

It is necessary to identify all state transitions which may occur in tracking the signal CHANGE. These states are shown on FIG. 6. By comparing the possible states with the condition of the ideal ALLOW signal ("ALLOW_IDEAL"), it is possible to categorize these states into three groups:
1) those in which ALLOW is always true (H1,H2,H6,L1,L2,L6)
2) those in which ALLOW is sometimes true (H3,H5,L3,L5) and
3) those in which ALLOW is never true (H4,L4).

Figure 8:
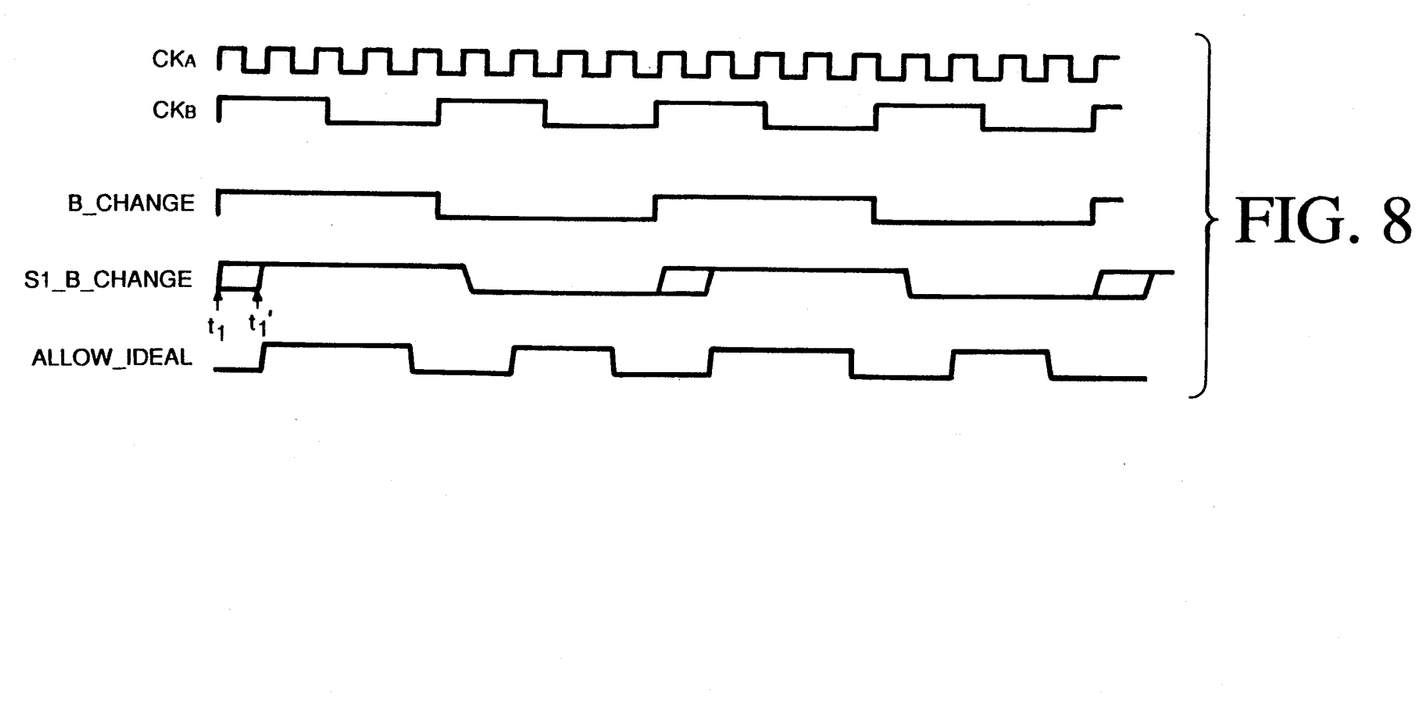
FIG. 8 shows a timing diagram showing a further example of the relevant signal timings of the apparatus of FIG. 5.

The synthesized ALLOW signal can only be asserted in states which fall into category 1. The result is that the signal ALLOW is asserted for a lower proportion of the time than the ideal allow signal ALLOW_IDEAL.

Where the frequency ratio between the two timing domains is not a whole number, a different state diagram will be required, and the ALLOW signal will have a period which may vary from cycle to cycle, as shown in FIG. 8. In this figure, the clock ratio is 4.5:1 ($CK_A$:$CK_B$), and the uncertainty in the transition of S1_B_CHANGE is shown at each rising edge only. It is known that the next transition in $CK_B$ will occur half way through a clock cycle $CK_A$.

In a system in which propagation delays between the first and second logic circuits are significant, this can be accommodated in the design of the phase synchronization machine by allowing for a further degree of uncertainty when synthesizing the ALLOW signal.

We claim:

1. A system comprising:
   a first logic circuit operating in a first timing domain at a first clock speed, and including a first transaction machine;
   a second logic circuit operating in a second timing domain at a second clock speed, and including a second transaction machine, said second clock speed being greater than said first clock speed;
   said first and second logic circuit being connected by a communication link, and
   said system characterized in that it includes a phase synchronization machine within said second timing domain including:
   means for receiving an input signal from said first logic circuit via a synchronizing flip-flop;
   means for using said input signal to determine the phase relationship between said first timing domain and said second timing domain, and
   means for using said phase relationship to generate a control signal indicating whether a communication signal transmitted from said second logic circuit as a result of a clock edge therein will be received by said first logic circuit at a time which does not violate timing conditions of said first logic circuit.

2. Apparatus as claimed in claim 1 wherein said phase synchronization machine is preprogrammed with information indicating the relative frequency ratio of said first and second logic circuits, and includes
   means to receive a transaction request signal from said first transaction machine at a time $t_0$ and to use the arrival of said request signal to infer the phase relationship between said first and second logic circuits at time $t_0$, and
   a control signal generation means including means to use said information indicating said relative frequency ratio and said phase relationship at time $t_0$ to determine an approximate phase relationship between said first and second logic circuits at a time later than time $t_0$.

3. Apparatus as claimed in claim 2 wherein said second transaction machine includes
   means to receive a transaction request signal and data associated therewith at time $t_0$;
   means to process said transaction request;
   and means to generate an acknowledge signal upon completion of said transaction at a time $t_1$, wherein said control signal is used to cause transmission of said acknowledge signal to said first logic circuit at a time $t_2$ not violating timing conditions in said first logic circuit.

4. Apparatus as claimed in claim 3 wherein said phase synchronization machine includes means for determining whether the time ti is sufficiently litter than time to thdt phase synchronization can no longer be guaranteed.

5. Apparatus as claimed in claim 1 further including:
   means for generating a clock change signal from a clock signal in said first timing domain, indicating the valid clock transitions in said first timing domain; and
   means for transmitting said clock change signal to said phase synchronization means in said second logic circuit, said clock change signal being applied as an input signal in order to determine the phase relationship between said first timing domain and said second timing domain.

6. Apparatus as claimed in claim 5 wherein said system includes means to transmit a transaction request signal to said first logic circuit, transmission of said transaction signal being timed by said control signal.

7. Apparatus as in claim 6 wherein said system includes means to transmit an acknowledge signal from said first logic circuit to said second logic circuit, wherein the receiving of said acknowledge signal is timed by said control signal.

8. A method for communication between a first logic circuit operating in a first timing domain at a first clock speed, and a second logic circuit operating in a second timing domain at a second clock speed, said second clock speed being faster than said first clock speed and said second clock speed and said first clock speed having a predetermined relation to one another, said first logic circuit and said second logic circuit being coupled by a communication link, wherein said method comprises the following steps:
   a) said first logic circuit issuing a transaction request over said communication link to said second logic circuit as a result of a clock edge in said first timing domain;
   b) said second logic circuit accepting said transaction request as a result of a clock edge in said second timing domain, acceptance of said transaction request being communicated to a phase synchronization machine within said second logic circuit and to a transaction machine within said second logic circuit;
   c) said transaction machine within said second logic circuit processing said transaction request and said phase synchronization machine within said second logic circuit counting the number of clock cycles in said second timing domain during the processing of said transaction;

d) upon completion of said transaction, said second logic circuit generating an acknowledge signal to be transmitted from said second logic circuit to said first logic circuit over said communication link as a result of a clock edge in said first timing domain, a synchronization being achieved by said phase synchronization machine using said predetermined relation between said first timing domain at said first clock speed and said second timing domain at said second clock speed in order to determine the allowable clock edges of the second timing domain to transmit said acknowledge signal to said first timing domain.

9. A method for communication between a first logic circuit operating in a first timing domain at a first clock speed, and a second logic circuit operating in a second timing domain at a second clock speed, said second clock speed being faster than said first clock speed and said second clock speed and said first clock speed having a predetermined relation to one another, said first logic circuit and said second logic circuit being coupled by a communication link, wherein said method comprises the following steps:

a) said first logic circuit generating a timing signal in said first timing domain indicating valid transitions of the first clock signal;

b) said second logic circuit receiving said timing signal and generating therefrom a clock change signal in said second timing domain;

c) said second logic circuit applying said clock change signal to a phase synchronization machine;

d) said second logic circuit issuing a transaction request signal over said communication link to said first logic circuit, said phase synchronization machine being operative to synchronize said transaction request signal to said first clock signal using said clock change signal;

e) said first logic circuit accepting said transaction request and transmitting said transaction request to a transaction machine in said first logic circuit;

f) said transaction machine in said first logic circuit processing said transaction request;

g) upon completion of said transaction request, said first logic circuit causing a transaction acknowledge signal to be transmitted to said second logic circuit; and h) said phase synchronization machine causing said second logic circuit to synchronize an acknowledge signal from said first logic circuit to said second timing domain by using said clock change signal.

10. A method as described in claim 9 wherein said phase synchronization machine uses said clock change signal to synthesize an allow signal, said allow signal being used for synchronization of said transaction request signal and said synchronization of said acknowledge signal.

* * * * *